United States Patent
Kline et al.

(10) Patent No.: US 11,120,791 B2
(45) Date of Patent: *Sep. 14, 2021

(54) COLLABORATIVE ARTIFICIAL INTELLIGENCE (AI) VOICE RESPONSE SYSTEM CONTROL FOR AUTHORIZING A COMMAND ASSOCIATED WITH A CALENDAR EVENT

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

This patent is subject to a terminal disclaimer.

(21) Appl. No.: 16/191,708

(22) Filed: Nov. 15, 2018

(65) Prior Publication Data
US 2020/0160856 A1    May 21, 2020

(51) Int. Cl.
*H04L 29/06* (2006.01)
*A63H 3/36* (2006.01)
(Continued)

(52) U.S. Cl.
CPC .............. *G10L 15/22* (2013.01); *G06F 3/167* (2013.01); *G06N 20/00* (2019.01); *G10L 15/34* (2013.01);
(Continued)

(58) Field of Classification Search
CPC ................................ H04L 63/102; A63H 3/36
See application file for complete search history.

(56) References Cited

U.S. PATENT DOCUMENTS 8,014,756 B1    9/2011    Henderson
8,412,599 B2    4/2013    Saiu et al.
(Continued)

FOREIGN PATENT DOCUMENTS

CN    106331780 A    1/2017
WO    2014144949 A3    11/2014

OTHER PUBLICATIONS

Ayres et al., "Voice activated command and control with speech recognition over WiFi," Science of Computer Programming 59, 2006, pp. 109-126.

*Primary Examiner* — Farzad Kazeminezhad
(74) *Attorney, Agent, or Firm* — Cantor Colburn LLP; Tihon Poltavets

(57) ABSTRACT

Described herein are methods, computer-readable media, techniques, and methodologies for collaborative control of an artificial intelligence (AI) voice response system and an AI voice response system configured for collaborative interaction and control. A user command submitted by a first user to an AI voice response client device is evaluated against a user profile associated with the first user to determine whether the user command requires authorization from a second user prior to execution. If authorization is required, the user command or those portion(s) of the user command requiring authorization are sent to a user device of the second user. The second user is provided with the capability to approve, reject, or modify the user command. If approved or modified, the user command or the modified command are executed and the execution result is presented to the first user via the AI voice response client device or another device.

20 Claims, 6 Drawing Sheets

(51) Int. Cl.
*G10L 15/22* (2006.01)
*G06F 3/16* (2006.01)
*G10L 15/34* (2013.01)
*G06N 20/00* (2019.01)

(52) U.S. Cl.
CPC .. *G10L 2015/223* (2013.01); *G10L 2015/227* (2013.01); *G10L 2015/228* (2013.01)

(56) References Cited

U.S. PATENT DOCUMENTS

| | | |
|---|---|---|
| 9,466,296 B2 | 10/2016 | Kaplan et al. |
| 9,965,247 B2 | 5/2018 | Jarvis et al. |
| 10,305,911 B1 * | 5/2019 | Eyre ............... H04L 63/102 |
| 10,616,310 B2 * | 4/2020 | Watry .............. A63H 3/36 |
| 2016/0148515 A1 * | 5/2016 | Augusto ........... G09B 5/00 |
| | | 434/365 |
| 2017/0228549 A1 | 8/2017 | Xuan et al. |
| 2018/0007060 A1 | 1/2018 | Leblang et al. |

* cited by examiner

COLLABORATIVE ARTIFICIAL INTELLIGENCE (AI) VOICE RESPONSE SYSTEM CONTROL FOR AUTHORIZING A COMMAND ASSOCIATED WITH A CALENDAR EVENT

BACKGROUND

The present invention relates generally to artificial intelligence (AI) voice response systems, and more particularly, to collaborative AI voice response system control.

AI voice response devices capable of responding to user voice commands or requests are available from a variety of manufacturers and are becoming increasing commonplace. Such devices are generally capable of responding to user requests for information or access to content; performing basic tasks in response to user commands such as adding items to a calendar, setting alarms/timers, or placing voice or video calls; or the like. More recent advancements in AI voice response technology include the ability to perform more complex tasks in response to user commands such as placing a food order, making a restaurant reservation, contacting a ride-sharing service, or the like. Upon receiving a voice command, an AI voice response system may convert the spoken input into text and execute the command. Existing AI voice response systems, however, suffer from a number of drawbacks, technical solutions to which are described herein.

SUMMARY

In one or more example embodiments, a computer-implemented method for collaborative control of an artificial intelligence (AI) voice response system is disclosed. The method includes receiving, at an AI back-end service of the AI voice response system, a user command received from a first user at an AI voice response client device and accessing a user profile of the first user. The method further includes determining, based at least in part on the user profile, that the user command requires authorization from a second user prior to execution; determining one or more portions of the user command that require the authorization from the second user; and sending an indication of at least the one or more portions of the user command to a user device associated with the second user. The method additionally includes receiving an indication that the second user has approved the one or more portions of the user command; executing the user command to obtain an execution result; and sending, by the AI back-end service to the AI voice response client device or to another device, the execution result for presentation to the first user via the AI voice response client device or the another device.

In one or more other example embodiments, an AI voice response system configured to be collaboratively controlled is disclosed. The AI voice response system includes one or more back-end servers executing an AI back-end service configured to communicate with an AI voice response client device. The one or more back-end servers include at least one memory storing computer-executable instructions and at least one processor configured to access the at least one memory and execute the computer-executable instructions to perform a set of operations. The operations include receiving, at the AI back-end service, a user command received from a first user at the AI voice response client device and accessing a user profile of the first user. The operations further include determining, based at least in part on the user profile, that the user command requires authorization from a second user prior to execution; determining one or more portions of the user command that require the authorization from the second user; and sending an indication of at least the one or more portions of the user command to a user device associated with the second user. The operations additionally include receiving an indication that the second user has approved the one or more portions of the user command; executing the user command to obtain an execution result; and sending, by the AI back-end service to the AI voice response client device or another device, the execution result for presentation to the first user via the AI voice response client device or the another device.

In one or more other example embodiments, a computer program product for collaborative control of an artificial intelligence (AI) voice response system is disclosed. The computer program product includes a non-transitory storage medium readable by a processing circuit, the storage medium storing instructions executable by the processing circuit to cause a method to be performed. The method includes receiving, at an AI back-end service of the AI voice response system, a user command received from a first user at an AI voice response client device and accessing a user profile of the first user. The method further includes determining, based at least in part on the user profile, that the user command requires authorization from a second user prior to execution; determining one or more portions of the user command that require the authorization from the second user; and sending an indication of at least the one or more portions of the user command to a user device associated with the second user. The method additionally includes receiving an indication that the second user has approved the one or more portions of the user command; executing the user command to obtain an execution result; and sending, by the AI back-end service to the AI voice response client device or another device, the execution result for presentation to the first user via the AI voice response client device or the another device.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
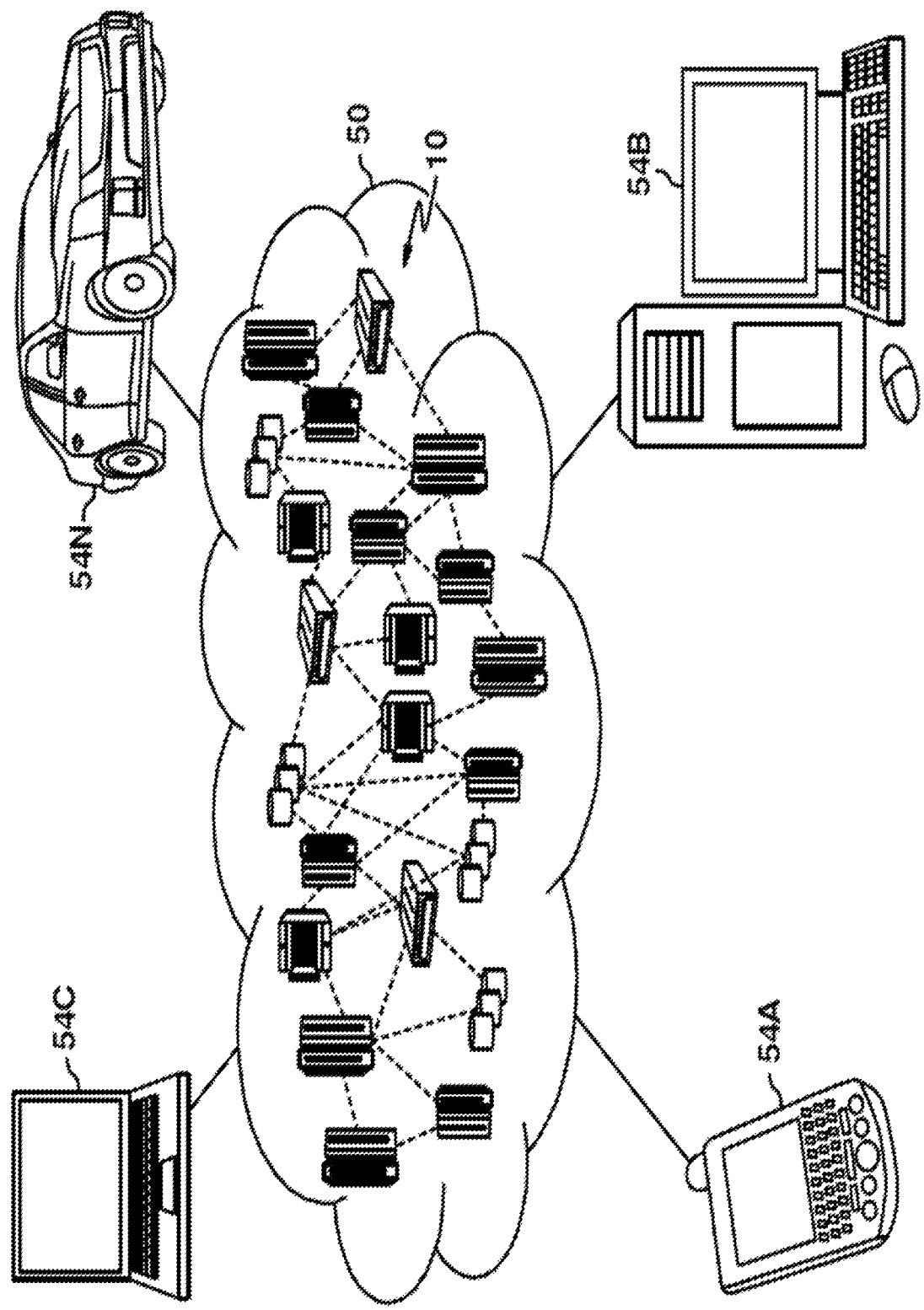
FIG. 1 depicts a cloud computing environment in accordance with one or more example embodiments of the disclosure.

Example embodiments relate to, among other things, methods, computer-readable media, techniques, and methodologies for collaborative control of an artificial intelligence (AI) voice response system and an AI voice response system configured for collaborative interaction and control. An AI voice response system in accordance with example embodiments includes an AI back-end service that executes on one or more back-end servers. In example embodiments, the AI back-end service is configured to communicate with an AI voice response client device which may include any device capable of receiving input from a user (e.g., voice input, text input, etc.) and communicating with the AI back-end service configured to execute commands corresponding to the input and provide the results of the executed commands or an indication thereof back to the user as output. In general, an AI voice response client device in accordance with example embodiments may include a speaker, a microphone, and a display for receiving input from a user and providing output to the user. An AI voice response client device may be, without limitation, a smartphone, a tablet, a wearable device, a voice-enabled device not intended for mobile use, a desktop computer, a laptop computer, a gaming console, a content streaming device, or the like.

In example embodiments, an AI voice response client device receives a command from a first user. The command may be a voice command spoken by the first user and captured by a microphone of the AI voice response client device. In example embodiments, the AI voice response client device is configured to execute a voice recognition algorithm to identify the spoken input captured by the microphone and perform a speech-to-text conversion to determine the command corresponding to the spoken input. In other example embodiments, the user command may be provided to the AI voice response client device in the form of text-based input, gesture-based input, or the like.

In example embodiments, the AI voice response client device may send the identified command (or some indication thereof) to a corresponding AI back-end service. Upon receipt of the command (or some indication thereof), the AI back-end service may access a user profile associated with the first user. In example embodiments, the AI back-end service determines, based at least in part on the accessed user profile, whether any portion of the command received from the first user requires authorization from a second user (an authorized user) in order to be executed. In example embodiments, a user profile may specify various keywords or phrases such that any user command submitted by a user associated with the user profile that includes such a keyword or phrase requires authorization from an authorized user before the user command can be executed. In example embodiments, the AI-back end service may parse the user command received at the AI voice response client device to identify one or more portions of the user command that are indicative of a desired execution result of the user command. More specifically, in example embodiments, the AI back-end service may parse the user command to identify an action being requested by the user command, content being requested by the user command, or the like. In example embodiments, the AI back-end service may attempt to locate in the parsed user command any keywords or phrases specified in the user profile as requiring authorization from the authorized user. If any such keyword or phrase is identified in the parsed user command, the AI back-end service may determine that authorization from the authorized user is required prior to executing the user command. In other example embodiments, the AI back-end service may perform a search for each such keyword or phrase in a speech-to-text converted user command without first parsing the command.

In example embodiments, a user profile may also designate that certain content or content types need to be approved by an authorized user before the content can be accessed by a user associated with the user profile. For example, a user profile may specify that content having certain ratings assigned to it in accordance with a ratings system may require approval from an authorized user prior to permitting a user associated with the user profile to access the content. As another non-limiting example, a user profile may specify that certain content categories requires authorization such as particular movie or video game genres. In addition, in example embodiments, a user profile may specify that certain actions which can be initiated by submitting a user command to an AI voice response client device require authorization from an authorized user. For example, a user command to request a car service, add an event to a calendar, or the like may require authorization from an authorized user. In example embodiments, an action or content requested by a user command may be identified based on particular words or phrases present in the user command. It should be appreciated that the above examples of types of user commands that may require authorization from an authorized user prior to execution are merely illustrative and not exhaustive.

In example embodiments, if some portion of a user command requires authorization from an authorized user prior to execution, at least those portion(s) of the user command requiring authorization (or an indication thereof) may be sent to a user device of an authorized user. For example, if the user command is "play [title of specific movie," then only the title of the movie may be sent to the user device of the authorized user. In other example embodiments, the entire user command may be sent to the user device of the authorized user. In particular, in example embodiments, the AI back-end service may identify, from the user profile of the user who submitted the user command, a linked user profile corresponding to a user designated for providing the authorization. The AI back-end service may then access the user profile for the authorized user to identify a user device to which to send the user command requiring authorization. In certain example embodiments, the AI voice response client device that received the user command may directly send at least those portion(s) of the user command requiring authorization to the user device of the authorized user via a local area network connection utilizing a communication protocol such as WiFi or Bluetooth.

In example embodiments, the authorized user is provided with the capability to approve, reject, or modify the user command via input provided to the user device. If the authorized user approves the user command, the user device of the authorized user may send an indication of approval to the AI back-end service, which may then execute the user command to obtain an execution result. The AI back-end service may then communicate the execution result to the AI voice response client device that received the user command or to another device such that the execution result can be presented to the requesting user via the AI voice response client device or via another device. For instance, if the user command is "play [title of horror movie]," the AI back-end service may access the corresponding content upon receiving the indication of approval from the authorized user and may stream the content to the AI voice response client device or to another device (e.g., a television or other content streaming device) for presentation to the requesting user. As another non-limiting example, if the user command is "add [title of event] to my calendar," then the AI back-end service may execute the user command upon receiving the indication of approval from the authorized user, and may provide an indication that the event has been added to the requesting user's calendar to the AI voice response client device or another device so that the requesting user can be informed that the requested action has been completed.

In other example embodiments, the authorized user may reject the user command. In such example embodiments, the authorized user may provide input to her user device indicating that the user command has been rejected. The user device of the authorized user may then send an indication of the rejection to the AI back-end service, which in turn, may send an indication of the rejection to the AI voice response client device to which the user command was submitted. In other example embodiments, the user device of the authorized user may directly send the indication of the rejection to the AI voice response client device to which the user command was submitted. The AI voice response client device may then notify the first user that the user command has been rejected.

In certain example embodiments, upon receiving the indication that the user command has been rejected, the AI voice response client device may present to the first user one or more alternative command options that are eligible for execution without requiring approval from the authorized user. In example embodiments, the AI back-end service may identify the alternative command option(s) and send an indication thereof to the AI voice response client device for presentation to the first user. For instance, if the user command is "play [title of horror movie]," then titles categorized in other genres or horror movies that do not require prior authorization from the authorized user or that have previously received authorization may be presented as selectable options to the first user. In example embodiments, the alternative command options may be related to the original user command that was rejected. For instance, if the user command that was rejected was a request to stream a horror movie, an alternative command option may be a request to stream a comedy movie. As another non-limiting example, if the user command that was rejected was a request to play a particular type of video game (e.g., a role-playing game), an alternative command option may be a request to play a game designated as having educational value. In certain example embodiments, the AI voice response client device may suggest the alternative command options to the first user who may then submit a desired alternative command option as a voice command or in another format to the AI voice response client device for execution. In other example embodiments, the alternative options may be presented to the first user via a television, tablet, smartphone, or other device such that the first user can select a desired option (e.g., select an icon corresponding to an alternative movie title) for execution (e.g., streaming of the selected title).

In example embodiments, the authorized user may modify the user command for which authorization is sought in lieu of approving or rejecting the user command. For instance, if the user command is a request to stream a movie title having a particular rating, the authorized user may modify the user command to a modified command to stream a particular alternative movie title having a more age-appropriate rating for the requesting user. Alternatively, the authorized user may modify the user command to obtain a modified user command that can be executed by the AI back-end service to identify and present a collection of alternative movie titles to the requesting user that have approved ratings. As another non-limiting example, if the user command is a request to play a particular video game that the authorized user deems is not appropriate (e.g., too violent) for the requesting user, the authorized user may modify the user command to a modified command to play another particular video game deemed acceptable or to a modified command to present alternative video game options to the requesting user (e.g., video games with approved ratings). In example embodiments, the authorized user may select various criteria (e.g., acceptable ratings) when modifying a user command that determines which content/actions are permitted by the modified command.

In certain example embodiments, the AI back-end service may automatically reject a user command based on information contained in the user profile of the requesting user. For instance, in certain example embodiments, a user profile may indicate certain content or content types or certain actions as being prohibited for a user such that any user command request such prohibited content or actions may be automatically rejected by the AI back-end service without a need to contact an authorized user. Further, in certain example embodiments, a user profile may specify various contextual rules that determine when a user command can be automatically rejected versus sent to an authorized user for approval, rejection, or modification. For instance, a user profile may specify that during a particular time period during the day (e.g., a time period reserved for completing homework) any user command requesting content or actions that have not been designated as being educational in nature is to be automatically rejected. As another non-limiting example, a contextual rule may specify that any user command is to be rejected during another particular time period (e.g., dinner time, bedtime, etc.).

It should be appreciated that the example embodiments described above and those described later in this disclosure are merely illustrative and not exhaustive. While example embodiments have been described in connection with user commands requesting access to particular content or particular types of content or requesting particular actions to be performed, it should be appreciated that a user command in accordance with example embodiments may include any user command to access any type of data or perform any type of action capable of being implemented by an AI voice response system. Further, while specific example types of content or actions have been described, it should be appreciated that example embodiments of the invention are applicable to any type of content or any type of action capable of being provided or executed by an AI voice response system.

Example embodiments provide various technical features, technical effects, and improvements to computer technology. Example embodiments provide the technical effect of enabling collaborative control of an AI voice response system by multiple users including a user who submits a user command to an AI voice response client device and an authorized user with the supervisory capacity to approve, reject, or modify the user command for execution. This technical effect is achieved, at least in part, by the technical features of evaluating a user command submitted by a requesting user against a user profile of the user that indicates particular content or content types, requested actions, particular keywords or phrases, and/or contextual rule(s) that require prior authorization from an authorized user to determine whether the user command requires such authorization, and providing a mechanism by which the user command (or those portion(s) of the user command requiring authorization) is sent to a user device of the authorized user to enable the authorized user to approve, reject, or modify the user command. The above-described technical effect and the technical features of example embodiments of the invention that enable this technical effect constitute an improvement to computer technology and an improvement to the functioning of a computer. In particular, example embodiments yield an improved AI voice response system capable of being collaboratively controlled by multiple users, which represents a technical solution/improvement over conventional AI voice response systems.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
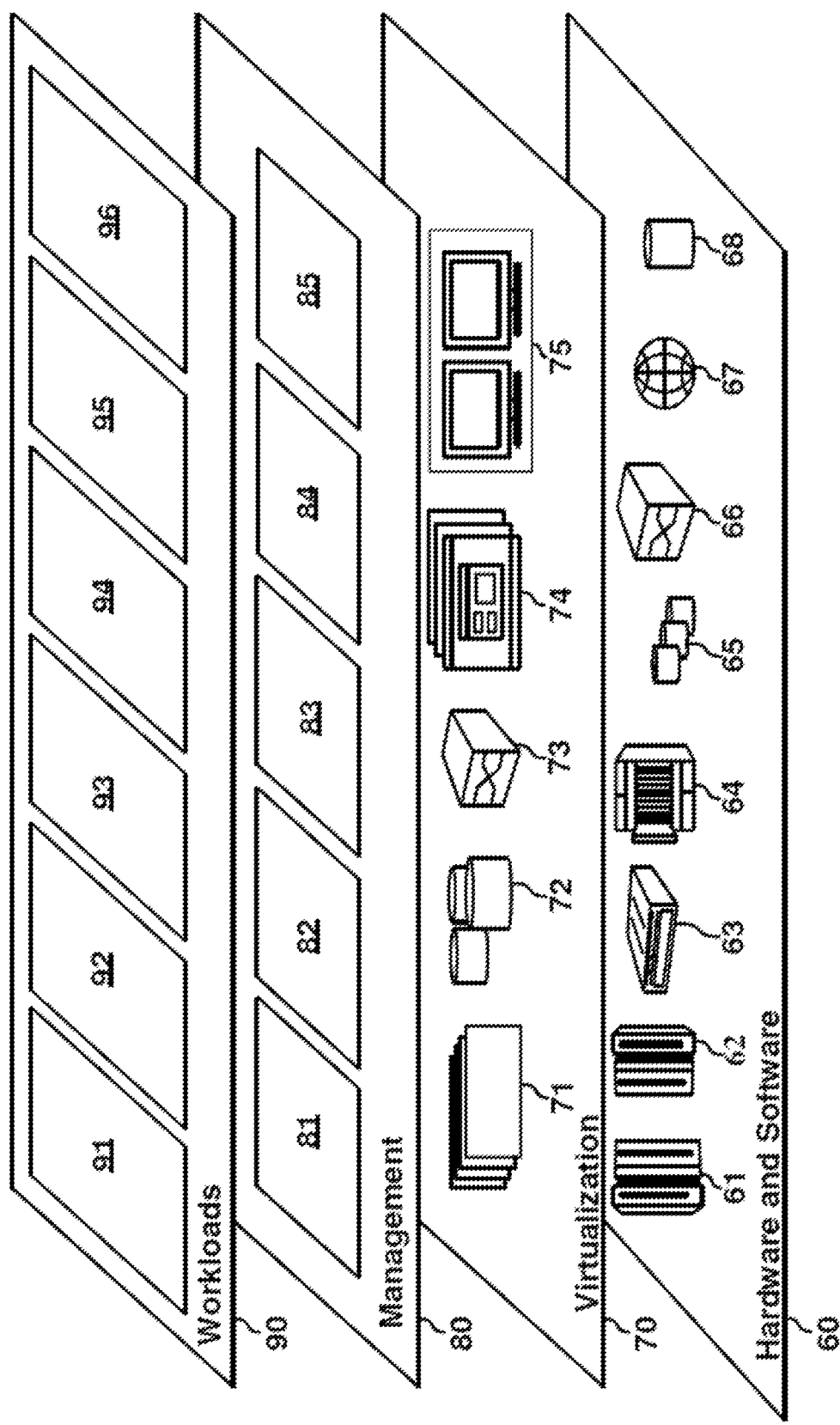
FIG. 2 depicts abstraction model layers in accordance with one or more example embodiments of the disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collaborative AI voice response system interaction and control 96.

An illustrative method in accordance with example embodiments of the invention and corresponding data structures associated therewith will now be described. It should be noted that each operation of the method 400 may be performed by one or more of the program modules or the like depicted in FIG. 5, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 3:
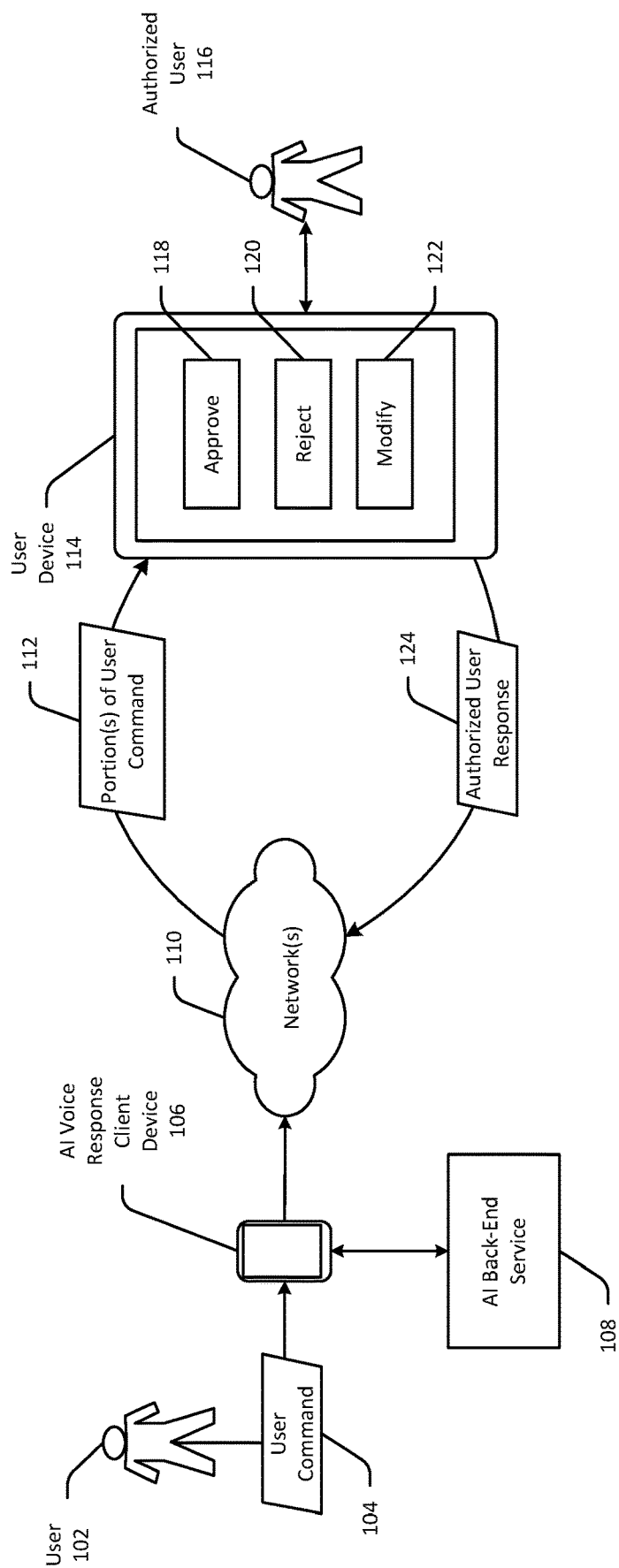
FIG. 3 is a schematic diagram illustrating collaborative control of an artificial intelligence (AI) voice response system in accordance with one or more example embodiments.
Figure 4A:
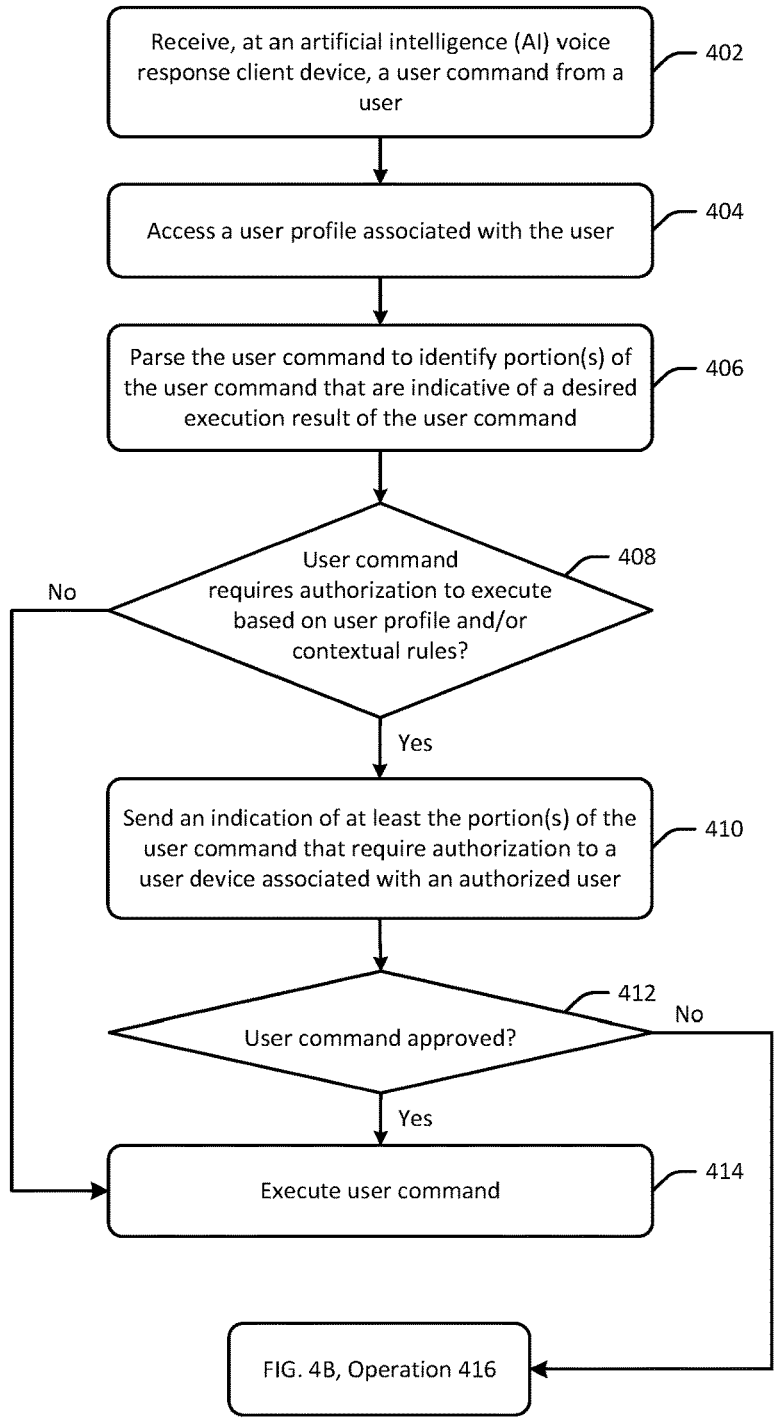
FIGS. 4A and 4B are process flow diagrams of an illustrative method for collaboratively controlling an AI voice response system in accordance with one or more example embodiments.
Figure 4B:
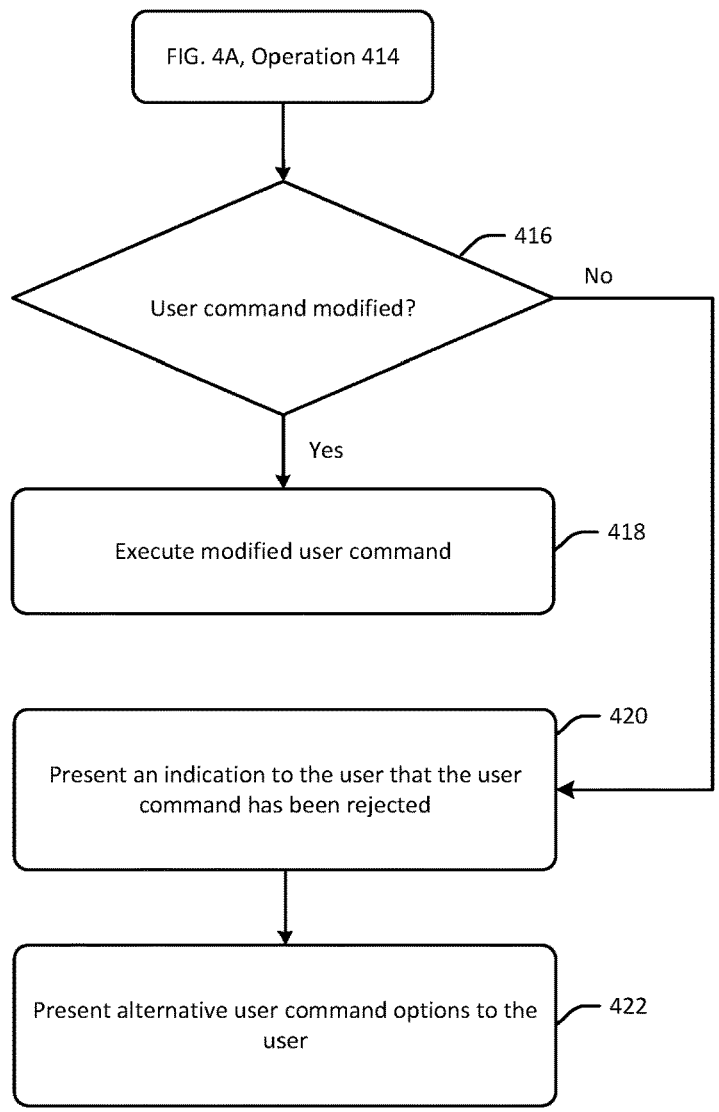

FIG. 3 is a schematic diagram illustrating collaborative control of an artificial intelligence (AI) voice response system in accordance with one or more example embodiments. FIGS. 4A and 4B are process flow diagrams of an illustrative method 400 for collaboratively controlling an AI voice response system in accordance with one or more example embodiments. FIGS. 4A and 4B will be described in conjunction with FIG. 3 hereinafter.

Figure 5:
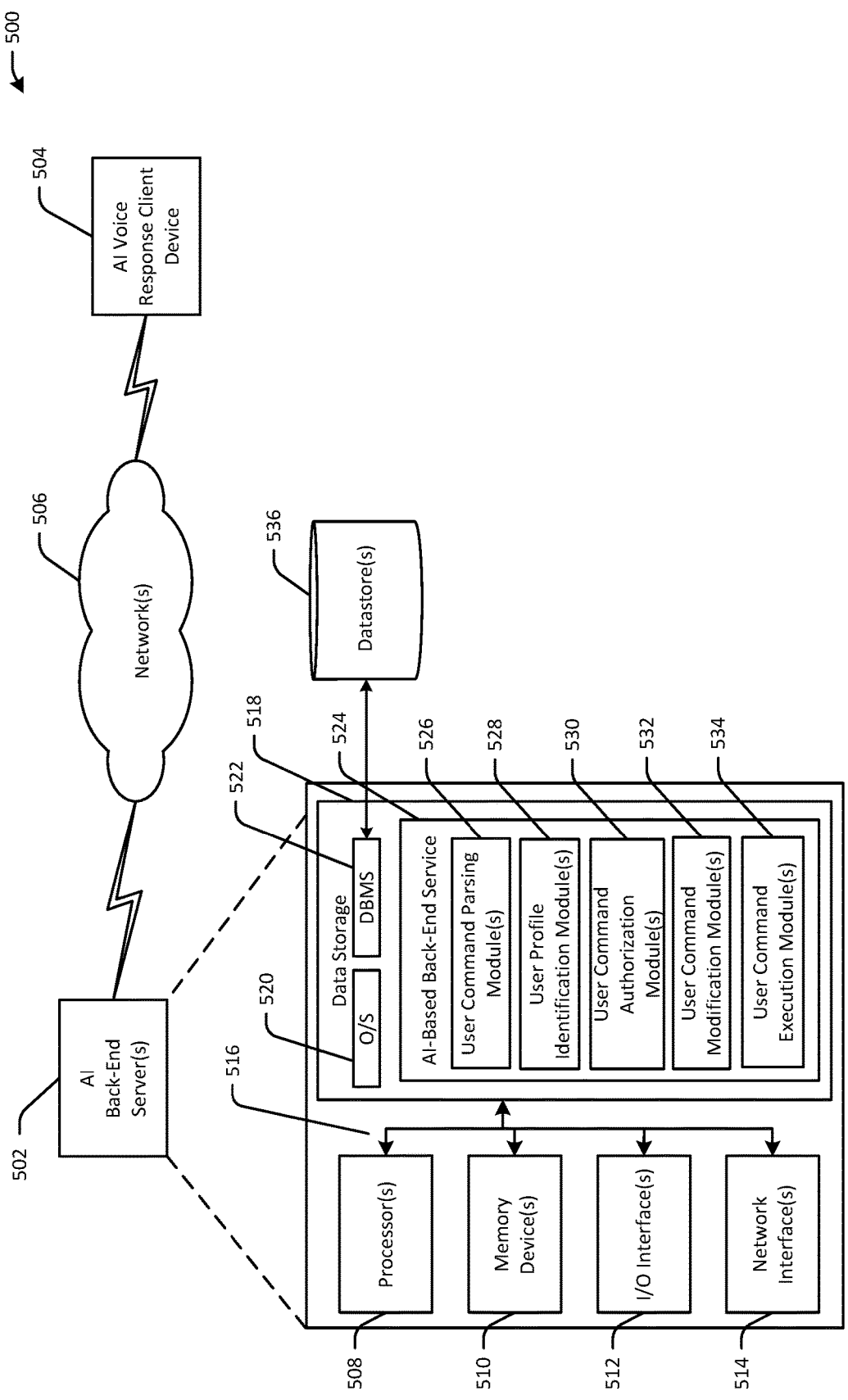
FIG. 5 is a schematic diagram of an illustrative networked architecture configured to implement one or more example embodiments.

Referring first to FIG. 4A in conjunction with FIG. 3, at block 402 of the method 400, a user command 104 is received from a user 102 at an AI voice response client device 106. In example embodiments, the AI voice response client device 106 may be configured to communicate with an AI back-end serviced 108 which may be executing on one or more AI back-end servers (FIG. 5, 502). The AI voice response client device 106 and the corresponding AI back-end service 108 may form part of an AI voice response system in accordance with example embodiments. The AI voice response client device 106 may be any suitable device capable of receiving voice, text, and/or other forms of input from a user (e.g., the user 102) and providing voice, visual, and/or tactile output to the user. As such, the AI voice response client device 106 may include one or more microphones for capturing voice input data and one or more speakers for providing voice output. The AI voice response client device 106 may also include a display for capturing text and/or other forms of touch/tactile input and displaying image data, video data, graphics, text, or the like. In certain example embodiments, the AI voice response client device 106 may include a physical keypad for providing text input. In addition, the AI voice response client device 106 may include any of a variety of sensors such as image sensor(s), inertial sensor(s), or the like. In example embodiments, the AI voice response client device 106 may include an image sensor (e.g., a camera) configured to capture gesture-based input received from the user 102. For instance, in example embodiments, the user command 104 may be a gesture or combination of gestures indicative of a desired action, requested content, or the like.

In example embodiments, the user command 104 may be a voice command spoken by the user 102 and captured by a microphone of the AI voice response client device 106. In example embodiments, the AI voice response client device 106 is configured to execute a voice recognition algorithm to identify the spoken input captured by the microphone and perform a speech-to-text conversion to determine the command corresponding to the spoken input. In other example embodiments, the user command 104 may be provided to the AI voice response client device 106 in the form of text-based input, gesture-based input, or the like. In certain example embodiments, the AI voice response client device 106 may relay a voice command 104 received from the user 102 to the AI back-end service 108 which may be configured to execute the voice recognition algorithm to perform the speech-to-text conversion.

Upon receipt of the user command 104 (or some portion or indication thereof) from the AI voice response client device 106, the AI back-end service 108 may execute computer-executable instructions of one or more user profile identification modules to access a user profile associated with the user 102 at block 404 of the method 400. Then, at block 406 of the method 400, the AI back-end service 108 may execute computer-executable instructions of one or more user command parsing modules to parse the user command 104 received at the AI voice response client device 106 to identify one or more portions of the user command 104 that are indicative of a desired execution result of the user command 104. More specifically, in example embodiments, the AI back-end service 108 may parse the user command 104 to identify an action being requested by the user command 104, content being requested by the user command 104, or the like.

At block 408 of the method 400, the AI back-end service 108 may execute computer-executable instructions of one or more user command authorization modules to determine, based at least in part on the accessed user profile, whether any portion of the user command 104 requires authorization from a second user (an authorized user 116) in order to be executed. In example embodiments, the user profile associated with the user 102 may specify various keywords or phrases such that if the user command 104 submitted by the user 102 includes such a keyword or phrase, the user command 104 would authorization from the authorized user 116 before the user command 104 can be executed. In example embodiments, at block 408, the AI back-end service 108 may attempt to locate in the parsed user command any keywords or phrases specified in the user profile as requiring authorization from the authorized user 116. If any such keyword or phrase is identified in the parsed user command, the AI back-end service 108 may make a positive determination at block 408 that authorization from the authorized user 116 is required prior to executing the user command 104. In other example embodiments, the AI back-end service 108 may perform a search for each such keyword or phrase in a speech-to-text conversion of the user command 104 without first parsing the command 104.

In example embodiments, the user profile associated with the user 102 may also designate that certain content or content types need to be approved by the authorized user 116 before the content can be accessed by the user 102. For example, the user profile may specify that content having certain ratings assigned to it in accordance with a rating system may require approval from the authorized user 116 prior to permitting the user 102 to access the content. As another non-limiting example, the user profile may specify that certain content categories require authorization such as particular movie genres, a particular categories of websites, or particular video game genres. In addition, in example embodiments, the user profile may specify that certain actions which can be initiated by submitting the user command 104 to the AI voice response client device 106 require authorization from the authorized user 116. For example, in example embodiments, if the user command 104 corresponds to a request for a car service, a request to add an event to a calendar, or the like, then the user command 104 may require authorization from the authorized user 116. In example embodiments, an action or content requested by the user command 104 may be identified based on particular words or phrases present in the user command 104.

In example embodiments, if a positive determination is made at block 408, that is, if some portion of the user command 104 requires authorization from the authorized user 116 prior to execution, at least those portion(s) 112 of the user command 104 requiring authorization (or an indication thereof) may be sent to a user device 114 of the authorized user 116 at block 410 of the method 400. For example, if the user command 104 is "play [title of specific movie]," then only the title of the movie may be sent to the user device 114. In other example embodiments, the entire user command 104 may be sent to the user device 114. In particular, in example embodiments, the AI back-end service 108 may identify, from the user profile of the user 102 who submitted the user command 104, a linked user profile corresponding to the authorized user 116. The AI back-end service 108 may then access the user profile for the authorized user 116 to identify a user device (e.g., the user device 114) to which to send the user command 104 requiring authorization. In example embodiments, the AI back-end service 108 may send the user command 104 (or those portion(s) 112 of the user command 104 requiring authorization) to the user device 114 via one or more networks 110, which may include any suitable public and/or private networks including any of the types of networks described in connection with FIG. 5 later in this disclosure. In certain example embodiments, the AI voice response client device 106 that received the user command 104 may directly send at least those portion(s) 112 of the user command 104 requiring authorization to the user device 114 of the authorized user 116 via a local area network connection utilizing a communication protocol such as WiFi or Bluetooth.

In example embodiments, the authorized user 116 is provided with the capability to approve 118, reject 120, or modify 122 the user command 104 via input provided to the user device 114. If the authorized user 116 approves the user command 104, the user device 114 of the authorized user 116 may send an indication 124 of approval to the AI back-end service 108, in which case, a positive determination may be made at block 412 of the method 400. The AI back-end service 108 may then execute computer-executable instructions of one or more user command execution modules at block 414 of the method 400 to execute the user command 104 and obtain an execution result. The AI back-end service 108 may then communicate the execution result to the AI voice response client device 106 that received the user command 104 or to another device (not shown) such that the execution result can be presented to the requesting user 102 via the AI voice response client device 106 or via another device. For instance, if the user command is "play [title of horror movie]," the AI back-end service 108 may access the corresponding content upon receiving the indication of approval from the authorized user 116 and may stream the content to the AI voice response client device 106 or to another device (e.g., a television or other content streaming device) for presentation to the requesting user 102. Referring again to block 408, if on the other hand, the AI back-end service 108 determines that the user command 104 does not require authorization from the authorized user 116 prior to execution (a negative determination at block 408), then the method 400 may proceed directly to block 414, and the user command 104 may be executed to obtain the execution result.

Referring now to FIG. 4B in conjunction with FIG. 3, in certain example embodiments, the authorized user 116 may modify the user command 104 for which authorization is sought in lieu of approving or rejecting the user command 104. For instance, if the user command 104 is a request to stream a movie title having a particular rating, the authorized user 116 may modify the user command 104 to a modified command to stream a particular alternative movie title having a more age-appropriate rating for the requesting user 102. An indication 124 of the modified user command may be sent to the AI back-end service 108, in which case, a positive determination may be made at block 416 of the method 400. The AI back-end service 108 may then execute the modified user command at block 418 of the method 400 to obtain a corresponding execution result. In other example embodiments, the AI back-end service 108 may execute the modified user command at block 418 to identify a collection of alternative content/actions that are approved for the user 102 (e.g., alternative movie titles that have approved ratings). In example embodiments, these alternatives may be presented to the user 102 via the AI voice response client device 106 as alternative user command options that the user 102 can submit the AI voice response client device 106. In other example embodiments, the alternatives may be presented as selection options via the AI voice response client device 106 or via another device.

In other example embodiments, the authorized user 116 may reject the user command 104. In such example embodiments, the authorized user 116 may provide input to the user device 114 indicating that the user command 104 has been rejected (e.g., selection of an icon 120 or the like indicative of a rejection of a user command). The user device 114 of the authorized user 116 may then send an indication 124 of the rejection to the AI back-end service 108. In example embodiments, the AI back-end service 108 may determine that the user command 104 has been rejected if a negative determination is made at blocks 408 and 416. The AI back-end service 108 may then send an indication of the rejection to the AI voice response client device 106 for presentation to the user 102 at block 420 of the method 400. In other example embodiments, the user device 114 of the authorized user 116 may directly send the indication 124 of the rejection to the AI voice response client device 108. The AI voice response client device 108 may then notify the user 102 that the user command 104 has been rejected.

In certain example embodiments, upon receiving the indication 124 that the user command 104 has been rejected, the AI voice response client device 108 may present, at block 422 of the method 400, one or more alternative command options to the user 102 that are eligible for execution without requiring approval from the authorized user 116. In example embodiments, the AI back-end service 108 may identify the alternative command option(s) and send an indication thereof to the AI voice response client device 108 for presentation to the user 102. For instance, if the user command 104 is "play [title of horror movie]," then titles categorized in other genres or horror movies that do not require prior authorization from the authorized user 116 or that have previously received authorization may be presented as selectable options to the user 102. In example embodiments, the alternative command options may be related to the original user command 104 that was rejected. For instance, if the user command 104 that was rejected was a request to stream a horror movie, an alternative command option may be a request to stream a comedy movie. As another non-limiting example, if the user command 104 that was rejected was a request to play a particular type of video game (e.g., a car racing game), an alternative command option may be a request to play a game designated as having educational value. In certain example embodiments, the AI voice response client device 108 may suggest the alternative command options to the user 102 who may then submit a desired alternative command option as a voice command or in another format to the AI voice response client device 108 for execution. In other example embodiments, the alternative options may be presented to the user 102 via a television, tablet, smartphone, or other device such that the user 102 can select a desired option (e.g., select an icon corresponding to an alternative movie title) for execution (e.g., streaming of the selected title).

In certain example embodiments, the AI back-end service 108 may automatically reject the user command 104 based on information contained in the user profile of the user 102. For instance, in certain example embodiments, the user profile may indicate that certain content or content types or certain actions are prohibited for the user 102 such that any user command requesting such prohibited content or actions may be automatically rejected by the AI back-end service 108 without a need to contact the authorized user 116. Further, in certain example embodiments, the user profile may specify various contextual rules that determine when the user command 104 can be automatically rejected as opposed to being sent to the authorized user 116 for approval 118, rejection 120, or modification 122. For instance, a contextual rule may specify that any user command is to be rejected during a particular time period (e.g., dinner time, bedtime, etc.).

In certain example embodiments, the AI back-end service 108 may execute computer-executable instructions of one or more user command modification modules to automatically modify the user command 104 to a modified command that does not require prior authorization from the authorized user 116. For instance, if the user command 104 corresponds to a request for content that has a prohibited rating for the user 102 (as determinable from the user profile associated with the user 102), the AI back-end service 108 may automatically modify the user command 104 to correspond to a request for related content that has an approved rating for the user 102 (as determinable from the user profile associated with the user 102).

Further, in certain example embodiments, if the AI back-end service 108 determines that the user command 104 requires authorization from the authorized user 116, the AI back-end service 108 may automatically identify alternative user command options or alternative content/actions selectable by the user 102 and present them to the user 102 in lieu of sending the user command 104 to the user device 114 for authorization by the user 116. In other example embodiments, the AI back-end service 108 may—in addition to identifying and presenting the alternative user command options to the user 102—concurrently provide the user 102 with the option to also send the original user command 104 to the authorized user 116 or concurrently automatically send the user command 104 to the authorized user 116. Further, in certain example embodiments, the user 102 may be provided with the option of sending the user command 104 to the authorized user 116 in lieu of being presented with the alternative user command options. In certain example embodiments, if the user command 104 is ultimately approved (or modified) by the authorized user 116, the user 102 may be presented with the option of executing the approved or modified user command or executing one of the alternative user command options.

It should be appreciated that the example embodiments described above and those described later in this disclosure are merely illustrative and not exhaustive. While example embodiments have been described in connection with user commands requesting access to particular content or particular types of content or requesting particular actions to be performed, it should be appreciated that a user command in accordance with example embodiments may include any user command to access any type of data or perform any type of action capable of being implemented by an AI voice response system. Further, while specific example types of content or actions have been described, it should be appreciated that example embodiments of the invention are applicable to any type of content or any type One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

FIG. 5 is a schematic diagram of an illustrative networked architecture 500 configured to implement one or more example embodiments of the disclosure. The networked architecture 500 may include one or more AI back-end servers 502 configured to execute an AI back-end service 524. The AI back-end server(s) 502 may be configured to communicate via one or more networks 506 with one or more voice response client devices 504 which may include any suitable device including, without limitation, a voice-enabled device not intended for mobile use, a tablet, a smartphone, a wearable device, a personal computer, or the like. While any particular component of the networked architecture 500 may be described herein in the singular, it should be appreciated that multiple instances of any such component may be provided, and functionality described in connection with a particular component may be distributed across multiple ones of such a component.

The network(s) 506 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the AI back-end server 502 may include one or more processors (processor(s)) 508, one or more memory devices 510 (generically referred to herein as memory 510), one or more input/output ("I/O") interface(s) 512, one or more network interfaces 514, and data storage 518. The AI back-end server 502 may further include one or more buses 516 that functionally couple various components of the AI back-end server 502.

The bus(es) 516 may include at least one of a system bus, a memory bus, an address bus, or a message bus, and may permit the exchange of information (e.g., data (including computer-executable code), signaling, etc.) between various components of the AI back-end server 502. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 510 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 510 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 510 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 518 may include removable storage and/or non-removable storage including, but not limited to, magnetic storage, optical disk storage, and/or tape storage. The data storage 518 may provide non-volatile storage of computer-executable instructions and other data. The memory 510 and the data storage 518, removable and/or non-removable, are examples of computer-readable storage media (CRSM) as that term is used herein.

The data storage 518 may store computer-executable code, instructions, or the like that may be loadable into the memory 510 and executable by the processor(s) 508 to cause the processor(s) 508 to perform or initiate various operations. The data storage 518 may additionally store data that may be copied to memory 510 for use by the processor(s) 508 during the execution of the computer-executable instructions. Moreover, output data generated as a result of execution of the computer-executable instructions by the processor(s) 508 may be stored initially in memory 510 and may ultimately be copied to data storage 518 for non-volatile storage.

More specifically, the data storage 518 may store one or more operating systems (O/S) 520; one or more database management systems (DBMS) 522 configured to access the memory 510 and/or one or more external datastores 532; and one or more program modules, applications, engines, managers, computer-executable code, scripts, or the like such as, for example, one or more user command parsing modules 526; one or more user profile identification modules 528; one or more user command authorization modules 530; one or more user command modification modules 532; and one or more user command execution modules 534. Each of the aforementioned modules may form part of the AI back-end service 524. In other example embodiments, one or more of above-described program modules may reside and execute, at least partially, on an AI voice response client device 504. Any of the components depicted as being stored in data storage 518 may include any combination of software, firmware, and/or hardware. The software and/or firmware may include computer-executable instructions (e.g., computer-executable program code) that may be loaded into the memory 510 for execution by one or more of the processor(s) 508 to perform any of the operations described earlier in connection with correspondingly named modules/services.

Although not depicted in FIG. 5, the data storage 518 may further store various types of data utilized by components of the AI back-end server 502 (e.g., data stored in the datastore(s) 532). Any data stored in the data storage 518 may be loaded into the memory 510 for use by the processor(s) 508 in executing computer-executable instructions. In addition, any data stored in the data storage 518 may potentially be stored in the external datastore(s) 532 and may be accessed via the DBMS 522 and loaded in the memory 510 for use by the processor(s) 508 in executing computer-executable instructions.

The processor(s) 508 may be configured to access the memory 510 and execute computer-executable instructions loaded therein. For example, the processor(s) 508 may be configured to execute computer-executable instructions of the various program modules, applications, engines, managers, or the like of the AI back-end server 502 to cause or facilitate various operations to be performed in accordance with one or more embodiments of the disclosure. The processor(s) 508 may include any suitable processing unit capable of accepting data as input, processing the input data in accordance with stored computer-executable instructions, and generating output data. The processor(s) 508 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 508 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 508 may be capable of supporting any of a variety of instruction sets.

Referring now to other illustrative components depicted as being stored in the data storage 518, the O/S 520 may be loaded from the data storage 518 into the memory 510 and may provide an interface between other application software executing on the AI back-end server 502 and hardware resources of the AI back-end server 502. More specifically, the O/S 520 may include a set of computer-executable instructions for managing hardware resources of the AI back-end server 502 and for providing common services to other application programs. In certain example embodiments, the O/S 520 may include or otherwise control the execution of one or more of the program modules, engines, managers, or the like depicted as being stored in the data storage 518. The O/S 520 may include any operating system now known or which may be developed in the future including, but not limited to, any server operating system, any mainframe operating system, or any other proprietary or non-proprietary operating system.

The DBMS 522 may be loaded into the memory 510 and may support functionality for accessing, retrieving, storing, and/or manipulating data stored in the memory 510, data stored in the data storage 518, and/or data stored in external datastore(s) 532. The DBMS 522 may use any of a variety of database models (e.g., relational model, object model, etc.) and may support any of a variety of query languages. The DBMS 522 may access data represented in one or more data schemas and stored in any suitable data repository. Data stored in the datastore(s) 532 may include, for example, user profiles, contextual rules, user commands, and so forth. External datastore(s) 532 that may be accessible by the AI back-end server 502 via the DBMS 522 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the AI back-end server 502, the input/output (I/O) interface(s) 512 may facilitate the receipt of input information by the AI back-end server 502 from one or more I/O devices as well as the output of information from the AI back-end server 502 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the AI back-end server 502 or may be separate. The I/O devices may further include, for example, any number of peripheral devices such as data storage devices, printing devices, and so forth.

The I/O interface(s) 512 may also include an interface for an external peripheral device connection such as universal serial bus (USB), FireWire, Thunderbolt, Ethernet port or other connection protocol that may connect to one or more networks. The I/O interface(s) 512 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The AI back-end server 502 may further include one or more network interfaces 514 via which the AI back-end server 502 may communicate with any of a variety of other systems, platforms, networks, devices, and so forth. The network interface(s) 514 may enable communication, for example, with one or more other devices via one or more of the network(s) 506.

While not depicted in FIG. 5, it should be appreciated that the AI voice response client device 504 may include similar hardware and/or software components as those depicted in FIG. 5 in connection with the AI back-end server 502. Further, it should be appreciated that the program modules depicted in FIG. 5 as being stored in the data storage 518 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the AI back-end server 502 or the voice response client device 504 and/or other computing devices accessible via the network(s) 506, may be provided to support functionality provided by the modules depicted in FIG. 5 and/or additional or alternate functionality.

Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 5 may be implemented, at least partially, in hardware and/or firmware across any number of devices.

It should further be appreciated that the AI back-end server 502 and/or the voice response client device 504 may include alternate and/or additional hardware, software, or firmware components beyond those described or depicted without departing from the scope of the disclosure. More particularly, it should be appreciated that software, firmware, or hardware components depicted or described as forming part of the AI back-end server 502 and/or the voice response client device 504 are merely illustrative and that some components may not be present or additional components may be provided in various embodiments. While various illustrative modules have been depicted and described as software modules stored in the data storage 518, it should be appreciated that functionality described as being supported by the modules may be enabled by any combination of hardware, software, and/or firmware.

It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 400 may be performed by an AI back-end server 502 having the illustrative configuration depicted in FIG. 5 (or in a distributed manner by an AI back-end server 502 and an AI voice response client device 504), or more specifically, by one or more program modules, engines, applications, or the like executable on such device(s). It should be appreciated, however, that such operations may be implemented in connection with numerous other device configurations.

The operations described and depicted in the illustrative method of FIGS. 4A and 4B may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 4A and 4B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for collaborative control of an artificial intelligence (AI) voice response system, the method comprising:
    receiving, at the AI voice response system, a user command received from a first user at an AI voice response client device, wherein the user command is a voice command, wherein the user command further comprises adding an event to a user calendar;
    accessing a user profile of the first user;
    determining, based at least in part on the user profile, that the user command requires authorization from a second user prior to execution;
    determining one or more portions of the user command that require the authorization from the second user;
    responsive to determining the one or more portions of the user command, sending an indication of at least the one or more portions of the user command to a user device associated with the second user;
    receiving an indication that the second user has approved the one or more portions of the user command;
    responsive to the approved one or more portions of the user command, adding the event to the calendar of the first user;
    executing the user command to obtain an execution result;
    sending, to the AI voice response client device or another device, the execution result for presentation to the first user via the AI voice response client device or the another device; and
    automatically identifying alternative content and presenting the identified alternative content to the first user prior to receiving the indication that the second user has approved the one or more portions of the user command.

2. The computer-implemented method of claim 1, wherein the user command is a first user command, the method further comprising:
    receiving, at an AI back-end system, a second user command received from the first user at the AI voice response client device;
    determining, based at least in part on the user profile, that the second user command is ineligible for execution; and
    sending, to the AI voice response client device, an instruction to notify the first user that the second user command is rejected.

3. The computer-implemented method of claim 2, wherein determining that the second user command is ineligible for execution comprises determining that the user profile comprises a contextual rule that indicates that the first user is ineligible to submit the user command during a particular time period during the day.

4. The computer-implemented method of claim 2, further comprising:
   determining a first requested action corresponding to the second user command;
   determining a second action related to the first requested action based at least in part on a stored association between the first action and the second action;
   identifying one or more user command options corresponding to the second action; and
   sending, to the AI voice response client device or the another device, an indication of the one or more user command options for presentation as selectable options to the first user via the AI voice response client device or the another device.

5. The computer-implemented method of claim 1, wherein determining, based at least in part on the user profile, that the user command requires authorization from the second user prior to execution comprises determining that the one or more portions of the user command comprise one or more keywords indicated in the user profile as requiring the authorization from the second user.

6. The computer-implemented method of claim 1, wherein the user command is a first user command, the method further comprising:
   receiving, at an AI back-end system, a second user command received from the first user at the AI voice response client device;
   determining, based at least in part on the user profile, that the second user command is ineligible for execution or requires the authorization from a second user prior to execution;
   modifying the second user command to obtain a modified command that is eligible for execution and does not require the authorization from the second user;
   determining one or more selectable options for executing the modified command; and
   sending, to the AI voice response client device or the another device, an indication of the one or more selectable options for presentation to the first user via the AI voice response client device or the another device.

7. The computer-implemented method of claim 1, wherein determining, based at least in part on the user profile, that the user command requires authorization from the second user prior to execution comprises determining that the user command is a request for content identified in the user profile as requiring the authorization from the second user prior to being accessible to the first user.

8. An artificial intelligence (AI) voice response system configured for collaborative control, comprising:
   one or more servers executing an AI back-end service configured to communicate with an AI voice response client device, the one or more servers comprising:
      at least one memory storing computer-executable instructions; and
      at least one processor, wherein the at least one processor is configured to access the at least one memory and execute the computer-executable instructions to:
         receive a user command received from a first user at the AI voice response client device, wherein the user command is a voice command, wherein the user command further comprises adding an event to a user calendar;
         access a user profile of the first user;
         determine, based at least in part on the user profile, that the user command requires authorization from a second user prior to execution;
         determine one or more portions of the user command that require the authorization from the second user;
         responsive to determining the one or more portions of the user command, send an indication of at least the one or more portions of the user command to a user device associated with the second user;
         receive an indication that the second user has approved the one or more portions of the user command;
         responsive to the approved one or more portions of the user command, adding the event to the calendar of the first user;
         execute the user command to obtain an execution result;
         send, to the AI voice response client device or another device, the execution result for presentation to the first user via the AI voice response client device or the another device; and
      automatically identify alternative content and presenting the identified alternative content to the first user prior to receiving the indication that the second user has approved the one or more portions of the user command.

9. The AI voice response system of claim 8, wherein the user command is a first command, and wherein the at least one processor is further configured to execute the computer-executable instructions to:
   receive a second user command received from the first user at the AI voice response client device;
   determine, based at least in part on the user profile, that the second user command is ineligible for execution; and
   send, to the AI voice response client device, an instruction to notify the first user that the second user command is rejected.

10. The AI voice response system of claim 9, wherein the at least one processor is configured to determine that the second user command is ineligible for execution by executing the computer-executable instructions to determine that the user profile comprises a contextual rule that indicates that the first user is ineligible to submit the user command during a particular time period during the day.

11. The AI voice response system of claim 9, wherein the at least one processor is further configured to execute the computer-executable instructions to:
   determine a first requested action corresponding to the second user command;
   determine a second action related to the first requested action based at least in part on a stored association between the first action and the second action;
   identify one or more user command options corresponding to the second action; and
   send, to the AI voice response client device or the another device, an indication of the one or more user command options for presentation as selectable options to the first user via the AI voice response client device or the another device.

12. The AI voice response system of claim 8, wherein the at least one processor is configured to determine, based at least in part on the user profile, that the user command requires authorization from the second user prior to execution by executing the computer-executable instructions to determine that the one or more portions of the user command comprise one or more keywords indicated in the user profile as requiring the authorization from the second user.

13. The AI voice response system of claim 8, wherein the user command is a first user command, and wherein the at least one processor is further configured to execute the computer-executable instructions to:
receive a second user command received from the first user at the AI voice response client device;
determine, based at least in part on the user profile, that the second user command is ineligible for execution or requires the authorization from a second user prior to execution;
modify the second user command to obtain a modified command that is eligible for execution and does not require the authorization from the second user;
determine one or more selectable options for executing the modified command; and
send, to the AI voice response client device or the another device, an indication of the one or more selectable options for presentation to the first user via the AI voice response client device or the another device.

14. The AI voice response system of claim 8, wherein the at least one processor is configured to determine, based at least in part on the user profile, that the user command requires authorization from the second user prior to execution by executing the computer-executable instructions to determine that the user command is a request for content identified in the user profile as requiring the authorization from the second user prior to being accessible to the first user.

15. A computer program product for collaborative control of an AI voice response system, the computer program product comprising a storage medium readable by a processing circuit, the storage medium storing instructions executable by the processing circuit to cause a method to be performed, the method comprising:
receiving, at the AI voice response system, a user command received from a first user at an AI voice response client device, wherein the user command is a voice command, wherein the user command further comprises adding an event to a user calendar;
accessing a user profile of the first user;
determining, based at least in part on the user profile, that the user command requires authorization from a second user prior to execution;
determining one or more portions of the user command that require the authorization from the second user;
responsive to determining the one or more portions of the user command, sending an indication of at least the one or more portions of the user command to a user device associated with the second user;
receiving an indication that the second user has approved the one or more portions of the user command;
responsive to the approved one or more portions of the user command, adding the event to the calendar of the first user;
executing the user command to obtain an execution result;
sending, to the AI voice response client device, the execution result for presentation to the first user via the AI voice response client device; and
automatically identifying alternative content and presenting the identified alternative content to the first user prior to receiving the indication that the second user has approved the one or more portions of the user command.

16. The computer program product of claim 15, wherein the user command is a first command, the method further comprising:
receiving, at an AI back-end system, a second user command received from the first user at the AI voice response client device;
determining, based at least in part on the user profile, that the second user command is ineligible for execution; and
sending, to the AI voice response client device, an instruction to notify the first user that the second user command is rejected.

17. The computer program product of claim 16, wherein determining that the second user command is ineligible for execution comprises determining that the user profile comprises a contextual rule that indicates that the first user is ineligible to submit the user command during a particular time period during the day.

18. The computer program product of claim 16, the method further comprising:
determining a first requested action corresponding to the second user command;
determining a second action related to the first action based at least in part on a stored association between the first action and the second action;
identifying one or more user command options corresponding to the second action; and
sending, to the AI voice response client device or to the another device, an indication of the one or more user command options for presentation as selectable options to the first user via the AI voice response client device or the another device.

19. The computer program product of claim 15, wherein determining, based at least in part on the user profile, that the user command requires authorization from the second user prior to execution comprises determining that the one or more portions of the user command comprise one or more keywords indicated in the user profile as requiring the authorization from the second user.

20. The computer program product of claim 15, wherein the user command is a first user command, the method further comprising:
receiving, at an AI back-end system, a second user command received from the first user at the AI voice response client device;
determining, based at least in part on the user profile, that the second user command is ineligible for execution or requires the authorization from a second user prior to execution;
modifying the second user command to obtain a modified command that is eligible for execution and does not require the authorization from the second user;
determining one or more selectable options for executing the modified command; and
sending, to the AI voice response client device or the another device, an indication of the one or more selectable options for presentation to the first user via the AI voice response client device or the another device.

* * * * *